(12) United States Patent
Simons et al.

(10) Patent No.: US 9,297,315 B2
(45) Date of Patent: Mar. 29, 2016

(54) SYSTEMS AND METHODS FOR DETERMINING A TARGET EXHAUST TEMPERATURE FOR A GAS TURBINE

(71) Applicant: General Electric Company, Schenectady, NY (US)

(72) Inventors: Derrick Simons, Greenville, SC (US); Douglas Dean, Greenville, SC (US); Carey Romoser, Greenville, SC (US); Kevin Wilkes, Greenville, SC (US); Predrag Popovic, Greenville, SC (US); Abhijit Kulkarni, Hyderabad (IN)

(73) Assignee: General Electric Company, Schenectady, NY (US)

( * ) Notice: Subject to any disclaimer, the term of this patent is extended or adjusted under 35 U.S.C. 154(b) by 778 days.

(21) Appl. No.: 13/630,610

(22) Filed: Sep. 28, 2012

(65) Prior Publication Data

US 2014/0090353 A1    Apr. 3, 2014

(51) Int. Cl.
| | |
|---|---|
| *F02C 9/00* | (2006.01) |
| *F02C 9/28* | (2006.01) |
| *F02C 9/16* | (2006.01) |
| *F02C 9/26* | (2006.01) |

(52) U.S. Cl.
CPC ... *F02C 9/00* (2013.01); *F02C 9/16* (2013.01); *F02C 9/26* (2013.01); *F02C 9/28* (2013.01); *F05D 2270/08* (2013.01); *F05D 2270/0831* (2013.01); *F05D 2270/303* (2013.01)

(58) Field of Classification Search
None
See application file for complete search history.

(56) References Cited

U.S. PATENT DOCUMENTS

| 5,697,209 | A | * | 12/1997 | Wettstein | 60/39.53 |
|---|---|---|---|---|---|
| 6,912,856 | B2 | | 7/2005 | Morgan | |
| 7,100,357 | B2 | | 9/2006 | Morgan | |
| 2004/0255595 | A1 | | 12/2004 | Morgan | |
| 2010/0050591 | A1 | * | 3/2010 | Nemet et al. | 60/39.24 |
| 2011/0185699 | A1 | * | 8/2011 | Danis et al. | 60/39.55 |
| 2012/0090291 | A1 | * | 4/2012 | Feinstein | 60/39.281 |

* cited by examiner

*Primary Examiner* — Gerald L Sung
*Assistant Examiner* — Scott Walthour
(74) *Attorney, Agent, or Firm* — Sutherland Asbill & Brennan LLP

(57) ABSTRACT

Embodiments of the invention can provide systems and methods for determining a target exhaust temperature for gas turbines. In one embodiment of the disclosure, there is disclosed a method for determining a target exhaust temperature for a gas turbine. The method can include determining a target exhaust temperature based at least in part on a compressor pressure condition; determining a temperature adjustment to the target exhaust temperature based at least in part on steam humidity; and changing the target exhaust temperature based at least in part on the temperature adjustment.

17 Claims, 6 Drawing Sheets

SYSTEMS AND METHODS FOR DETERMINING A TARGET EXHAUST TEMPERATURE FOR A GAS TURBINE

FIELD OF THE DISCLOSURE

Embodiments of the disclosure relate generally to gas turbines, and more particularly to systems and methods for determining a target exhaust temperature for gas turbines.

BACKGROUND OF THE DISCLOSURE

In some gas turbines, steam injection may be utilized to suppress temperature, thereby enabling additional fuel to be injected into the gas turbine, resulting in additional power output. However, the addition of steam into the gas turbine may affect the emissions of the gas turbine. For example, when steam is injected into a gas turbine using a Dry-Low-NOx (DLN) combustion system, combustion stability and/or emissions compliance problems may arise. That is, the injection of steam may impact the combustion process significantly, which may result in generally poor performance and emissions.

BRIEF DESCRIPTION OF THE DISCLOSURE

Some or all of the above needs and/or problems may be addressed by certain embodiments of the disclosure. Disclosed embodiments may include systems and methods for determining a target exhaust temperature for a gas turbine. According to one embodiment of the disclosure, there is disclosed a method for determining a target exhaust temperature for a gas turbine. The method can include determining a target exhaust temperature based at least in part on a compressor pressure condition; determining a temperature adjustment to the target exhaust temperature based at least in part on steam humidity; and changing the target exhaust temperature based at least in part on the temperature adjustment.

According to another embodiment of the disclosure, there is disclosed an apparatus for determining a target exhaust temperature for a gas turbine. The apparatus can include a controller comprising a computer processor; and a memory in communication with the computer processor operable to store computer-executable instructions operable to: determine a target exhaust temperature based at least in part on a compressor pressure condition; determine a temperature adjustment to the target exhaust temperature based at least in part on steam humidity; and change the target exhaust temperature based at least in part on the temperature adjustment.

Further, according to another embodiment of the invention, there is disclosed a system for determining a target exhaust temperature for a gas turbine. The system can include a gas turbine engine comprising one or more compressors, one or more combustors, or one or more turbines; a steam source for injecting steam into pre-combustion/post-compression air; a controller comprising a computer processor; and a memory in communication with the computer processor operable to store computer-executable instructions operable to: determine a target exhaust temperature based at least in part on a compressor pressure condition; determine a temperature adjustment to the target exhaust temperature based at least in part on steam humidity; and change the target exhaust temperature based at least in part on the temperature adjustment.

Other embodiments, aspects, and features of the disclosure will become apparent to those skilled in the art from the following detailed description, the accompanying drawings, and the appended claims.

BRIEF DESCRIPTION OF THE DRAWINGS

Reference will now be made to the accompanying drawings, which are not necessarily drawn to scale, and wherein.

DETAILED DESCRIPTION OF THE DISCLOSURE

Figure 1:
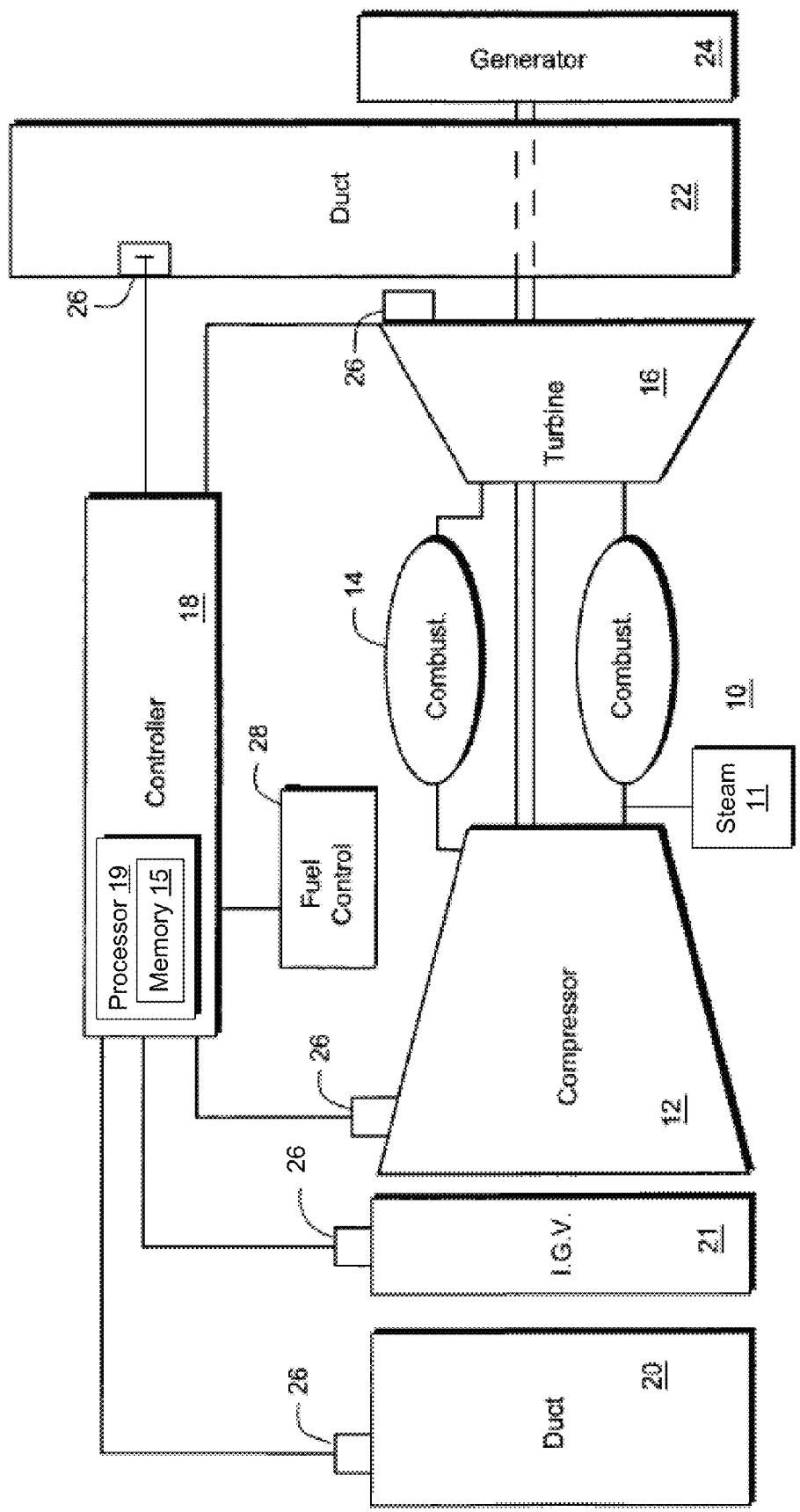
FIG. 1 is an example schematic of a system for determining a target exhaust temperature for a gas turbine, according to an embodiment of the disclosure.

Illustrative embodiments of the disclosure will now be described more fully hereinafter with reference to the accompanying drawings, in which some, but not all embodiments of the disclosure are shown. The disclosure may be embodied in many different forms and should not be construed as limited to the embodiments set forth herein; rather, these embodiments are provided so that this disclosure will satisfy applicable legal requirements. Like numbers refer to like elements throughout.

Illustrative embodiments of the disclosure are directed to, among other things, systems and methods for determining a target exhaust temperature for a gas turbine. Certain illustrative embodiments of the invention may be directed to injecting steam into pre-combustion/post-compression air. In some instances, a target exhaust temperature may be determined based at least in part on a compressor pressure condition. In other instances, a temperature adjustment to the target exhaust temperature may be determined based at least in part on steam humidity from the pre-combustion/post-compression air injected steam. Further, in yet other instances, the target exhaust temperature may be changed based at least in part on the temperature adjustment.

In one embodiment, determining the temperature adjustment may be further based on at least one of: CO or NOx emissions reference conditions. In another embodiment, determining the temperature adjustment may be further based at least in part on turbine inlet specific humidity and steam humidity. In still another embodiment, determining the temperature adjustment may be further based at least in part on a delta inlet pressure loss, a current compressor condition, and/or a delta exhaust temperature output. Likewise, in some instances, determining the temperature adjustment may be further based at least in part on a delta back pressure, a current compressor condition, and/or a delta exhaust temperature output.

In certain aspects, a plurality of the target exhaust temperatures may be generated. In this manner, in some instances, one or more of the plurality of target exhaust temperatures may be selected to facilitate control of the gas turbine. In other aspects, the target exhaust temperature may be applied by a controller to determine a turbine firing temperature. Likewise, in some examples, the target exhaust temperature may be applied by a controller to determine a fuel flow and/or an air flow to a combustor of the gas turbine. In any instance, the disclosed systems and methods may be repeated periodically during operation of the gas turbine.

Certain embodiments of the disclosure can provide a technical solution to determining a target exhaust temperature for a gas turbine. For example, the systems and methods disclosed herein may provide an adjustment to a predicted gas turbine exhaust temperature. In some instances, the adjusted target exhaust temperature may facilitate emissions compliance (e.g., NOx and CO) that accommodate for the injection of steam into pre-combustion/post-compression air. For example, in certain embodiments, a turbine steam flow measurement may be used to determine an adjustment that may be applied to an existing humidity term in a NOx and/or a CO boundary algorithm. In this manner, the predictive emissions limit exhaust temperatures may be adjusted in the appropriate amount relative to the rate of steam flow. These temperatures may be used elsewhere in a control algorithm to set turbine fuel and/or air flows to achieve emissions compliance.

In one illustrative embodiment, FIG. 1 depicts a gas turbine 10 having a compressor 12, combustor 14, turbine 16 drivingly coupled to the compressor 12 and a control system 18. An inlet 20 to the compressor 12 may feed ambient air and possibly injected water to the compressor 12. The inlet may have ducts, filters, screens and sound absorbing devices that each may contribute to a pressure loss of ambient air flowing through the inlet 20 into the inlet guide vanes 21 of the compressor 12. An exhaust duct 22 for the turbine may direct combustion gases from the outlet of the turbine 16 through ducts having, for example, emission control and sound absorbing devices. The exhaust duct 22 may apply a back pressure to the turbine 16. The amount of back pressure may vary over time due to the addition of components to the duct 22 and to dust and dirt clogging the exhaust passages. In one example embodiment, the turbine may drive a generator 24 that produces electrical power. In other instances, however, the turbine may be associated mechanical drive applications. The inlet loss to the compressor 12 and the turbine exhaust pressure losses may tend to be a function of corrected flow through the gas turbine 10. Accordingly, the amount of inlet loss and turbine back pressure may vary with flow through the gas turbine 10.

In certain embodiments, a steam injector 11 may inject steam into pre-combustion/post-compression air. In some instances, the steam injected by the steam injector 11 may be utilized to suppress temperature so that additional fuel may be injected into the gas turbine 10, which may increase the power output of the gas turbine 10.

The operation of the gas turbine 10 may be monitored by several sensors 26 detecting various components and conditions of the gas turbine 10, generator 24, and/or environment. For example, temperature sensors may monitor ambient temperature surrounding the gas turbine, compressor discharge temperature, turbine exhaust gas temperature, and other temperature measurements of the gas stream through the gas turbine 10. In some examples, pressure sensors may monitor ambient pressure, and static and dynamic pressure levels at the compressor inlet and outlet, and turbine exhaust, as well as at other locations in the gas stream. Further, in other examples, humidity sensors (e.g., wet and dry bulb thermometers) may measure ambient humidity in the inlet duct of the compressor. In some instances, the sensors 26 may also comprise flow sensors, speed sensors, flame detector sensors, valve position sensors, guide vane angle sensors, or the like that sense various parameters pertinent to the operation of gas turbine 10. As used herein, "parameters" and similar terms refer to items that can be used to define the operating conditions of the gas turbine 10, such as temperatures, pressures, and flows at defined locations in the gas turbine 10 that can be used to represent a given turbine operating condition.

A fuel control system 28 may regulate the fuel flowing from a fuel supply to the combustor 14, a split between the fuel flowing into primary nozzles and the fuel mixed with air before flowing into a combustion chamber, and may select the type of fuel for the combustor 14. The fuel control system 28 may be a separate unit or may be a component of a larger controller 18. For example, in some instances, the controller 18 may be a computer system having a processor(s) 19 that executes programs to control the operation of the gas turbine 10 using sensor inputs and instructions from human operators. The programs executed by the controller 18 may include scheduling algorithms for regulating fuel flow and/or air flow to the combustor 14. The commands generated by the controller may cause actuators on the gas turbine 10 to, for example, adjust valves between the fuel supply and combustors 14 that regulate the flow and type of fuel, inlet guide vanes 21 on the compressor 12, and other control settings on the gas turbine 10.

The controller 18 may regulate the gas turbine 10 based, at least in part, on algorithms stored in a computer memory 15 of the controller. These algorithms may enable the controller 18 to maintain the NOx and CO emissions in the turbine exhaust to within certain predefined limits and to maintain the combustor firing temperature to within predefined temperature limits. The algorithms may include parameters for current compressor pressure ratio, ambient specific humidity, inlet pressure loss, and/or turbine exhaust back pressure. Because of these parameters in the algorithms, the controller 18 may accommodate for, among other things, the injection of steam into pre-combustion/post-compression air by steam injector 11.

In certain embodiments, the combustor 14 may be a DLN combustion system. Moreover, in some instances, the control system 18 may be programmed and/or modified to control the DLN combustion system. Example DLN combustion control algorithms are set forth in FIGS. 2 to 6.

Figure 2:
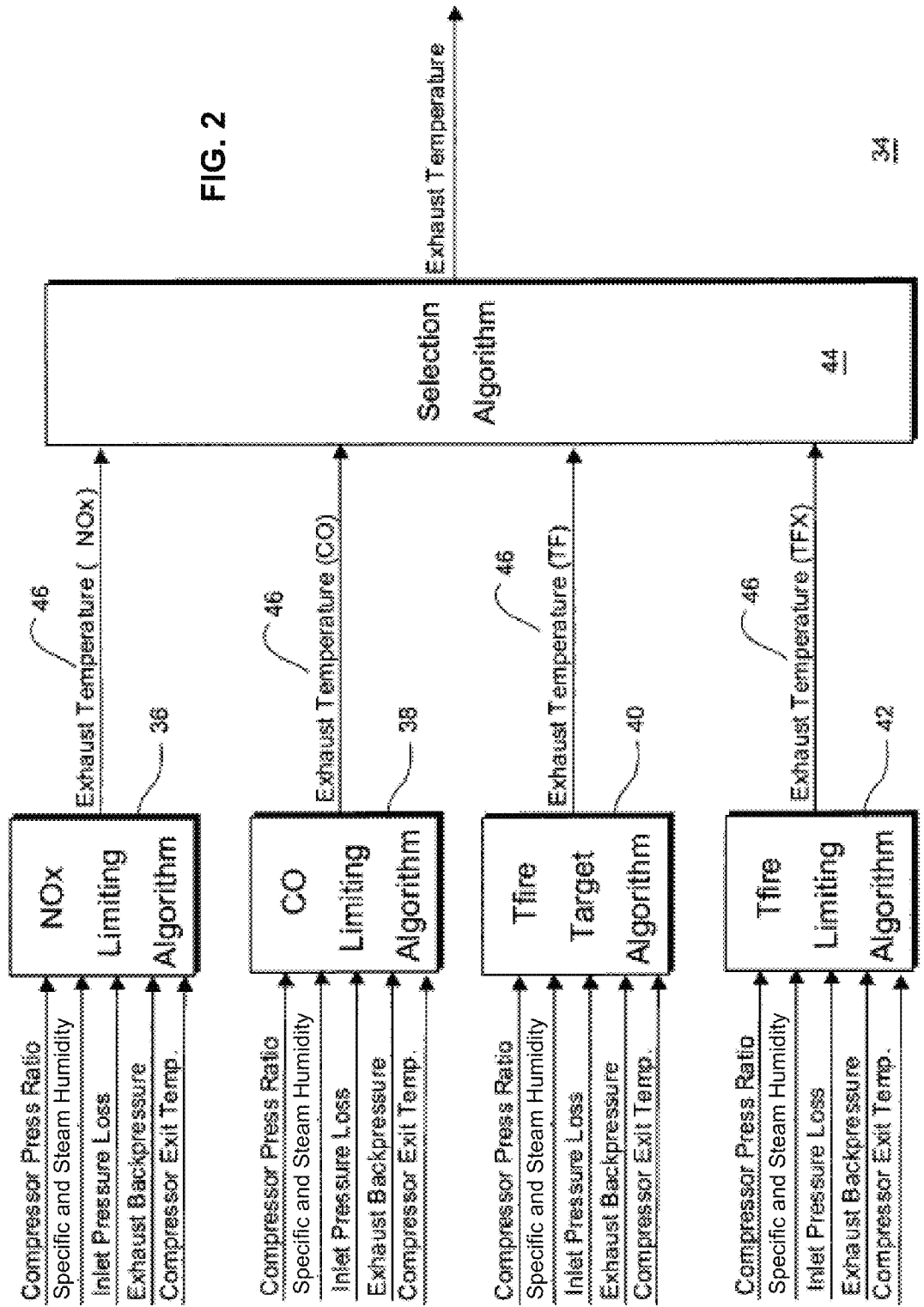
FIG. 2 is a schematic illustrating details of an example data flow for determining a target exhaust temperature for a gas turbine, according to an embodiment of the disclosure.

In one illustrative embodiment, FIG. 2 depicts a block diagram illustrating an exemplary data flow 34 for establishing, for example, a limiting turbine exhaust temperature based on a NOx emission limiting process 36, a CO emission limiting process 38, a target turbine firing temperature (Tfire) process 40, and a Tfire limiting process 42. These processes 36, 38, 40 and 42 may each output a separate desired turbine exhaust temperature. In some instances, the process 34 may include selection logic 44 to select one of the input desired exhaust temperatures. For example, in certain aspects, the process 34 may be used to maintain turbine emissions and firing temperature at or below target levels, especially as ambient conditions, inlet pressure loss, exhaust back pressure, and/or the injection of steam varies. In addition, in other aspects, the process 34 may enable for smooth transitions in the operation of the gas turbine 10 as changes occur in ambient conditions, as steam is injected into the gas turbine, and as in inlet pressure loss and back pressure vary.

Figure 3:
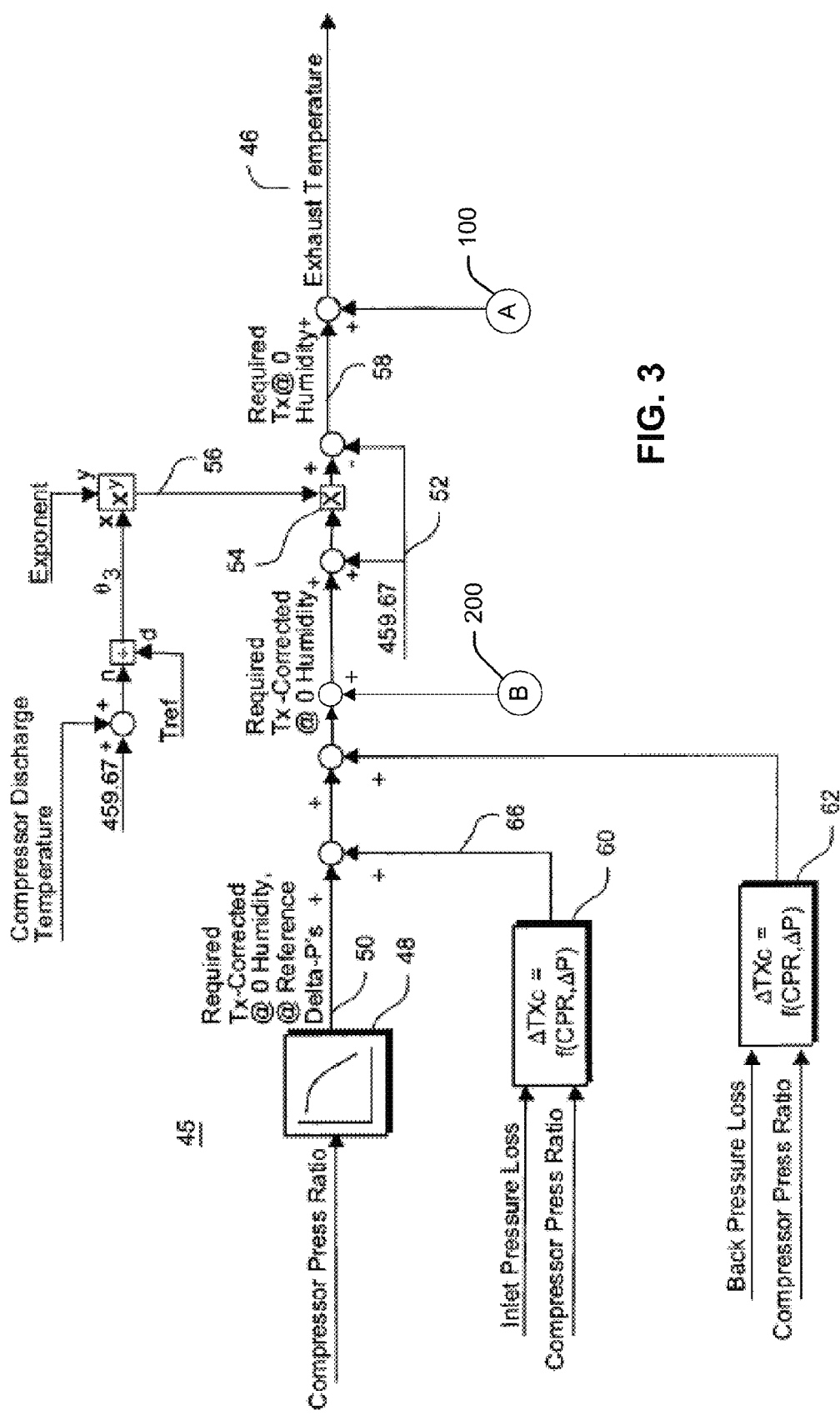
FIG. 3 is a schematic illustrating details of an example data flow for determining a target exhaust temperature for a gas turbine, according to an embodiment of the disclosure.

FIG. 3 is a schematic diagram of a process 45 that may, in some instances, represent each of the processes 36, 38, 40 and 42 that produce a target turbine exhaust temperature 46. The NOx, CO, and Tfire limiting processes and the Tfire Target process may each have their own unique schedules and correction factor exponent, but are otherwise similar and represented by process 45. In one example, the processes may receive input data regarding, for example, the current compressor pressure ratio, the specific humidity of the ambient air entering the compressor 12, the pressure lost of ambient air passing through the inlet duct 20, and the back pressure on the turbine exhaust gas due to the exhaust duct 22. In certain aspects, based on these inputs, the NOx, CO, and Tfire limiting processes 36, 38 and 42, and the Tfire target process each may produce a desired target exhaust temperature 46.

In one illustrative embodiment, the representative process 45 may include a schedule 48 for applying the compressor pressure ratio to derive a corrected turbine exhaust temperature 50. For example, the compressor pressure ratio vs. exhaust temperature target schedule 48 may be a graph, lookup table, or function that correlates the compressor pressure ratio to a corrected exhaust temperature target. In some instances, the schedule 48 may be generated for each gas turbine or gas turbine class in a conventional manner. In this manner, the schedule 48 may yield a corrected exhaust temperature for a defined reference load and/or ambient conditions, e.g., humidity and temperature.

To derive the desired actual exhaust temperature, the corrected exhaust temperature may be adjusted to account for the load, the ambient temperature and humidity, and the injected steam. For example, in one illustrative embodiment, the corrected exhaust temperature 50 (after being adjusted to account for compressor inlet pressure loss and exhaust back pressure) may be converted to an absolute temperature level, such as degrees Rankine in step 52. That is, a temperature in Fahrenheit may be converted to Rankine by adding 459.67 degrees. The absolute temperature may then be multiplied, at step 54, by a correction factor 56 which may be a function $(X^y)$ of a correction factor exponent (y) and a compressor temperature ratio (X). The correction factor exponent (y) may be empirically derived, and be specific to each algorithm 36, 38, 40 and 42 and to each class of gas turbine 10. The compressor temperature ratio (X) may be an indication of gas turbine load. The compressor temperature ratio may be the current compressor discharge temperature over a reference compressor temperature (Tref), such as the compressor temperature at full gas turbine load. The temperatures applied for the compressor temperature ratio may be absolute temperatures. By multiplying the function $(X^y)$ and the corrected target exhaust temperature, an uncorrected target exhaust temperature 58, converted to a non-absolute temperature scale, may be generated.

The corrected turbine exhaust temperature 50 output from the compressor pressure ratio schedule 48 does not account for deviations in the compressor inlet pressure loss, the exhaust back pressure loss, the changes in ambient humidity, the changes due to the injection of steam, and/or the gas turbine 10 unit specific deviations. Additional schedules, 60, 62, 100, and 200 may be applied to adjust the target turbine exhaust temperature for changes in these conditions. For example, the schedule 60 for the inlet pressure loss may be a function that correlates a delta exhaust temperature to the actual compressor pressure ratio and the compressor inlet pressure loss (or the change between actual inlet pressure loss and the defined inlet pressure loss applied in developing the compressor schedule 48). In some instances, the inlet pressure loss schedule 60 may be a function of compressor ratio because the pressure loss is a function of corrected flow through the gas turbine 10 and does vary with the load on the gas turbine 10. For example, the delta exhaust temperature value 66 output from the inlet pressure loss schedule 60 may be a corrected temperature value. Accordingly, the delta exhaust temperature value 66 may be summed with the target corrected exhaust temperature 50 derived from the compressor schedule 48.

Similarly, in certain embodiments, the back pressure schedule 62 may produce a delta value for the corrected exhaust temperature 50 based on a function of the compressor pressure ratio and the actual back pressure (or the change between actual back pressure and the defined back pressure applied in developing the compressor schedule 48). For example, the back pressure schedule 62 may be a function of compressor ratio because the turbine back pressure loss is a function of corrected flow through the gas turbine and does vary with the load on the gas turbine.

Figure 4:
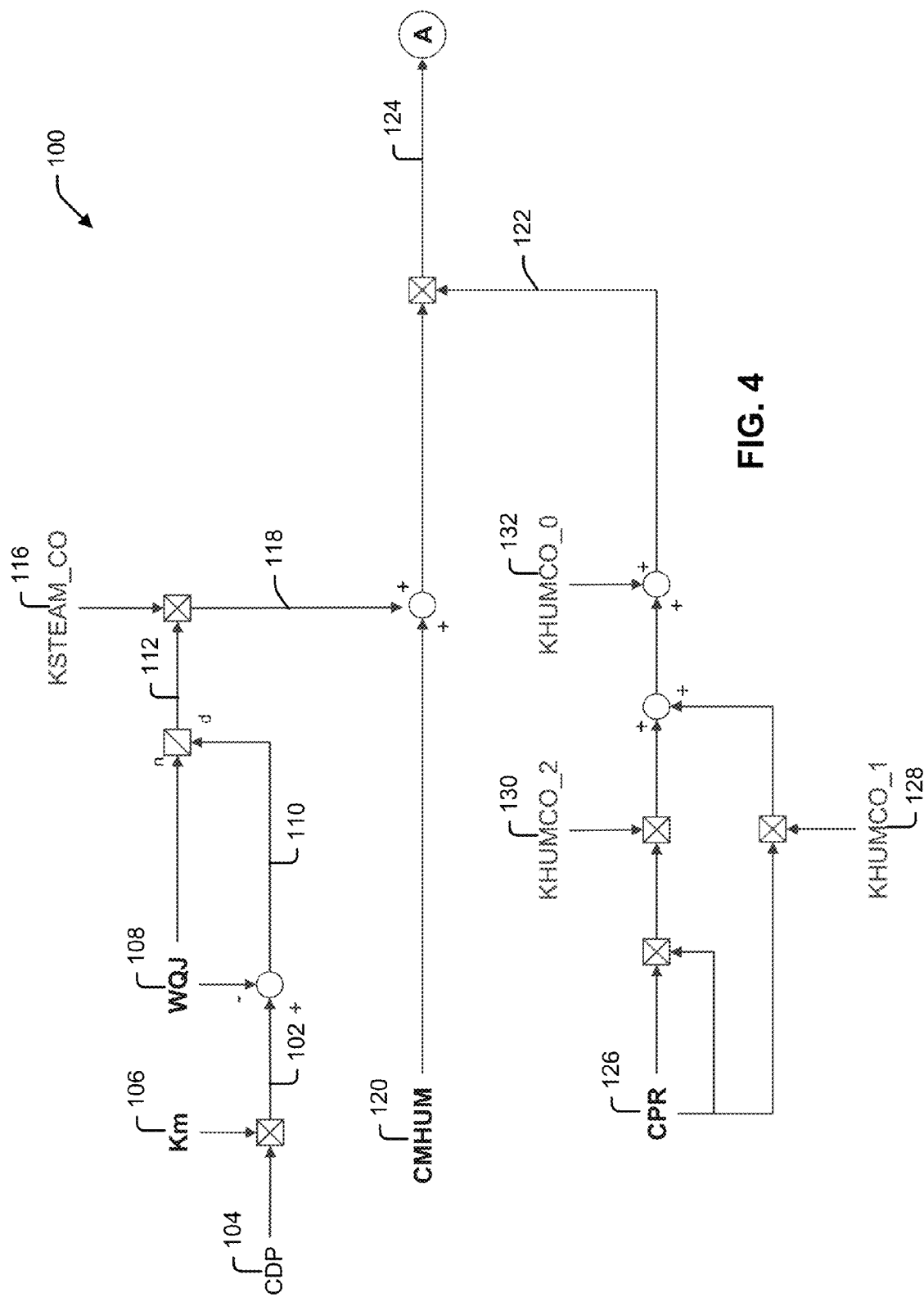
FIG. 4 is a schematic illustrating details of an example data flow for determining a target exhaust temperature for a gas turbine, according to an embodiment of the disclosure.

FIG. 4 depicts an example embodiment of the humidity and injected steam schedule 100. For example, in some instances, the compressor discharge pressure 104 may be multiplied by a constant 106 to determine a total flow rate 102 of the compressor, which may include a combined flow rate of the air and steam. Next, the steam flow rate 108 may be subtracted from the total flow rate 102 to determine the air flow rate 110. Further, the steam flow rate 108 may be divided by the air flow rate 110 to determine the water concentration 112. The water concentration 112 may then be multiplied by a constant 116, which may be a calibration factor that is application specific, to determine the steam humidity 118. The steam humidity 118 may then be summed with the inlet ambient humidity 120. The summed steam humidity 118 and inlet ambient humidity 120 may then be multiplied by a variable 122 to convert the summed humidity in to a delta temperature 124, which may be applied to adjust the target turbine exhaust temperature to account for the injected steam and ambient humidity conditions. For example, the delta temperature 124 may be a positive or negative value. In some instances, the variable 122 may comprise the compressor pressure ratio 126, which may be squared and/or multiplied and/or summed with one or more constants 128, 130, and 132.

Figure 5:
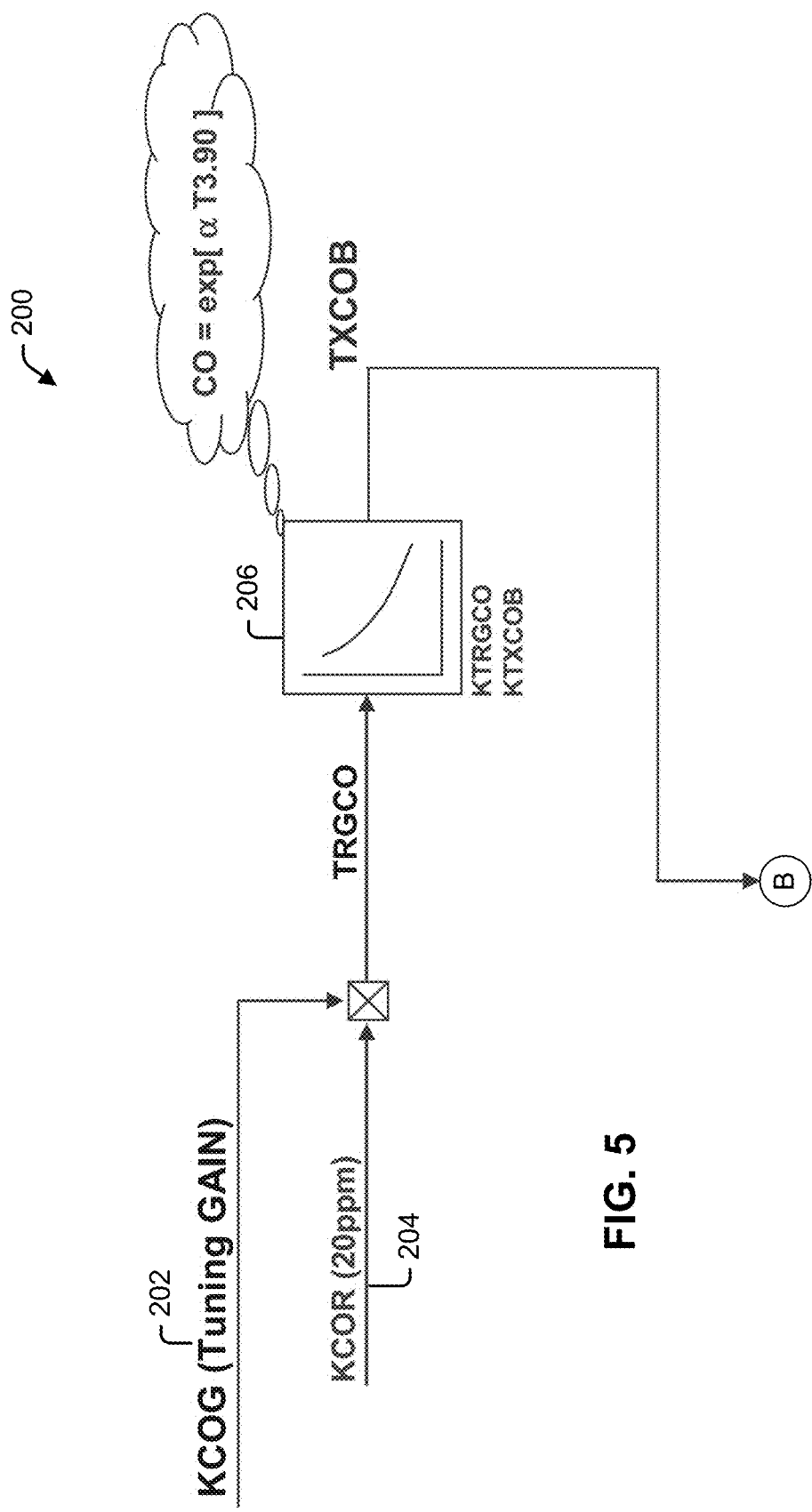
FIG. 5 is a schematic illustrating details of an example data flow for determining a target exhaust temperature for a gas turbine, according to an embodiment of the disclosure.

FIG. 5 depicts an example embodiment of calibration schedule 200. For example, an adjustment for the CO boundary may be determined by setting a target CO level at step 202. The target CO level 202 may be multiplied by a parts-per-million limit reference condition 204. Next, the multiplied target 202 and limit 204 may be applied to a schedule 206 for applying the CO boundary to derive a corrected turbine exhaust temperature.

Figure 6:
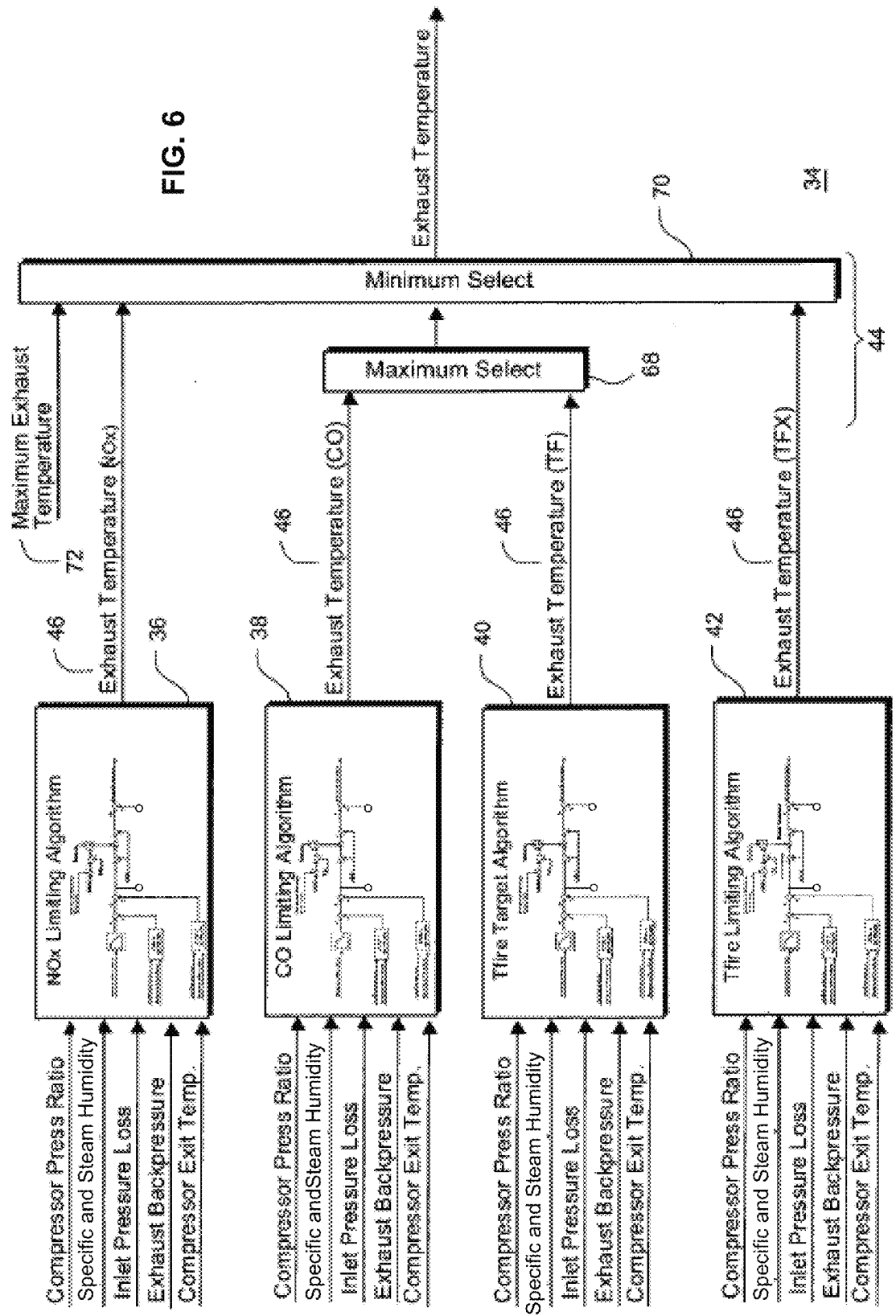
FIG. 6 is a schematic illustrating details of an example data flow for determining a target exhaust temperature for a gas turbine, according to an embodiment of the disclosure.

FIG. 6 is a schematic that compresses the information from FIG. 3 into the blocks for each of the algorithms shown in FIG. 2. FIG. 6 illustrates that the representative algorithm 45 may be tailored to and applied to each of the algorithms 36, 38, 40 and 48. The selection logic 44 may include a maximum select logic unit 68 that may identify the hottest temperature between the target exhaust 46 from the CO limiting algorithm 38 and the Tfire Target Algorithm 40. The hottest temperature identified by the maximum select 68 may be applied to a minimum select logic unit 70 that identifies the coolest of the temperatures output from the maximum select logic unit 68, the uncorrected target exhaust levels from the NOx limiting algorithm and the Tfire limiting algorithm, and a maximum exhaust temperature level 72. The output of the minimum select unit 70 may be applied as the uncorrected target turbine exhaust level 74. The controller 18 may adjust the fuel control to achieve the target turbine exhaust level 74.

The selection logic 44 also may provide smooth transition in target turbine exhaust during a transition from one selected limiting algorithm to the selection of another algorithm as operating conditions change. The selection of the exhaust target levels may indirectly dictate the required combustor firing temperature and the level of the alternate emission when the schedule is in force.

Although embodiments have been described in language specific to structural features and/or methodological acts, it is That which is claimed:

1. A method comprising:
    determining a target exhaust temperature for a gas turbine engine comprising a compressor based at least in part on a compressor pressure condition;
    determining a total flow rate comprising an air flow rate of the compressor and a steam flow rate of the compressor by multiplying a compressor discharge pressure by a constant;
    determining the air flow rate by subtracting the steam flow rate from the total flow rate;
    determining a water concentration by dividing the steam flow rate by the air flow rate;
    determining a steam humidity by multiplying the water concentration by a calibration factor that is application specific;
    determining a temperature adjustment to the target exhaust temperature based at least in part on the steam humidity;
    changing the target exhaust temperature based at least in part on the temperature adjustment; and
    applying the target exhaust temperature using a controller to set a fuel flow and/or air flow to a combustor of the gas turbine to achieve emissions requirements.

2. The method of claim 1, wherein determining the temperature adjustment is further based on at least one of a CO or NOx emissions reference condition.

3. The method of claim 1, wherein determining the temperature adjustment is further based at least in part on turbine ambient specific humidity.

4. The method of claim 1, wherein determining the temperature adjustment is further based at least in part on delta inlet pressure loss, current compressor condition, and delta exhaust temperature output.

5. The method of claim 1, wherein determining the temperature adjustment is further based at least in part on delta back pressure, current compressor condition, and delta exhaust temperature output.

6. The method of claim 1, further comprising:
    generating a plurality of target exhaust temperatures; and
    selecting one of the plurality of target exhaust temperatures to facilitate control of the gas turbine engine.

7. The method of claim 1, wherein the target exhaust temperature is applied by the controller to determine a turbine firing temperature.

8. The method of claim 1, wherein the method is repeated periodically during operation of the gas turbine.

9. An apparatus, comprising:
    a gas turbine engine;
    a controller comprising a computer processor; and
    a memory in communication with the computer processor storing computer-executable instructions operable to, when executed by the computer processor, cause the computer processor to:
        determine a target exhaust temperature for a gas turbine engine comprising a compressor based at least in part on a compressor pressure condition;
        determine a total flow rate comprising an air flow rate of the compressor and a steam flow rate of the compressor by multiplying a compressor discharge pressure by a constant;
        determine the air flow rate by subtracting the steam flow rate from the total flow rate;
        determine a water concentration by dividing the steam flow rate by the air flow rate;
        determine a steam humidity by multiplying the water concentration by a calibration factor that is application specific;
        determine a temperature adjustment to the target exhaust temperature based at least in part on the steam humidity;
        change the target exhaust temperature based at least in part on the temperature adjustment; and
        apply the target exhaust temperature using the controller to set a fuel flow and/or air flow to a combustor of the gas turbine engine to achieve emissions requirements.

10. The apparatus of claim 9, wherein determining the temperature adjustment is further based on at least one of a CO or NOx emissions reference condition.

11. The apparatus of claim 9, wherein determining the temperature adjustment is further based at least in part on turbine ambient specific humidity.

12. The apparatus of claim 9, wherein determining the temperature adjustment is further based at least in part on delta inlet pressure loss, current compressor condition, and delta exhaust temperature output.

13. The apparatus of claim 9, wherein determining the temperature adjustment is further based at least in part on delta back pressure, current compressor condition, and delta exhaust temperature output.

14. The apparatus of claim 9, wherein the target exhaust temperature is applied by the controller to determine a turbine firing temperature.

15. The apparatus of claim 9, wherein the computer-executable instructions are executed periodically during operation of the gas turbine engine.

16. A system, comprising:
    a gas turbine engine comprising one or more compressors, one or more combustors, or one or more turbines;
    a steam source for injecting steam into pre-combustion, post-compression air;
    a controller comprising a computer processor; and
    a memory in communication with the computer processor storing computer-executable instructions operable to, when executed by the computer processor, cause the computer processor to:
        determine a target exhaust temperature based at least in part on a compressor pressure condition;
        determine a total flow rate comprising an air flow rate of the compressor and a steam flow rate of the compressor by multiplying a compressor discharge pressure by a constant;
        determine the air flow rate by subtracting the steam flow rate from the total flow rate;
        determine a water concentration by dividing the steam flow rate by the air flow rate;
        determine a steam humidity by multiplying the water concentration by a calibration factor that is application specific;
        determine a temperature adjustment to the target exhaust temperature based at least in part on the steam humidity;
        change the target exhaust temperature based at least in part on the temperature adjustment; and
        apply the target exhaust temperature using the controller to set a fuel flow and/or air flow to a combustor of the gas turbine engine to achieve emissions requirements.

17. The system of claim 16, wherein determining the temperature adjustment is further based on at least one of a CO or NOx emissions reference condition.

* * * * *